(12) United States Patent
Narayan et al.

(10) Patent No.: US 9,196,085 B2
(45) Date of Patent: Nov. 24, 2015

(54) INTERACTIVELY SHAPING TERRAIN THROUGH COMPOSABLE OPERATIONS

(75) Inventors: Smita Narayan, Manchester, NH (US); Christopher E. Putnam, Manchester, NH (US)

(73) Assignee: Autodesk, Inc., San Rafael, CA (US)

( * ) Notice: Subject to any disclaimer, the term of this patent is extended or adjusted under 35 U.S.C. 154(b) by 1132 days.

(21) Appl. No.: 13/178,353

(22) Filed: Jul. 7, 2011

(65) Prior Publication Data

US 2013/0013264 A1    Jan. 10, 2013

(51) Int. Cl.
*G06F 17/50*  (2006.01)
*G06T 17/00*  (2006.01)
*G06T 17/05*  (2011.01)

(52) U.S. Cl.
CPC ............ *G06T 17/005* (2013.01); *G06T 17/05* (2013.01)

(58) Field of Classification Search
CPC ............ G06F 17/50; G06F 17/30241; G06F 2217/04; G06F 17/00; G06F 2217/02; G06F 2217/06; H04W 16/20
USPC ................................................ 703/1, 2, 13
See application file for complete search history.

(56) References Cited

U.S. PATENT DOCUMENTS

| | | | |
|---|---|---|---|
| 5,329,464 A | 7/1994 | Sumic et al. | |
| 5,553,211 A | 9/1996 | Uotani | |
| 5,980,096 A | 11/1999 | Thalhammer-Reyero | |
| 6,075,540 A * | 6/2000 | Hoppe | 345/419 |
| 6,496,814 B1 | 12/2002 | Busche | |
| 6,732,120 B1 | 5/2004 | Du | |
| 6,768,928 B1 | 7/2004 | Nagasawa et al. | |
| 6,912,692 B1 | 6/2005 | Pappas | |
| 7,130,774 B2 | 10/2006 | Thomas et al. | |
| 7,164,883 B2 | 1/2007 | Rappaport et al. | |
| 7,523,396 B2 | 4/2009 | Lewis et al. | |
| 7,617,077 B2 | 11/2009 | Putnam et al. | |
| 7,634,149 B2 | 12/2009 | Putnam et al. | |
| 7,965,902 B1 | 6/2011 | Zelinka et al. | |
| 8,051,087 B2 | 11/2011 | Campbell et al. | |
| 8,171,424 B1 | 5/2012 | Karam | |
| 8,180,597 B2 | 5/2012 | Connor et al. | |
| 8,346,016 B1 | 1/2013 | Zelinka et al. | |
| 8,457,441 B2 | 6/2013 | Joy | |
| 8,494,255 B2 | 7/2013 | Caduff | |
| 8,538,676 B2 | 9/2013 | Wuersch et al. | |

(Continued)

OTHER PUBLICATIONS

Kalisch et al.("Causal Inference Using Graphical Models with the R Package pcalg", American Statistical Association, Submitted 2010, pp. 1-26).*

(Continued)

*Primary Examiner* — Omar Fernandez Rivas
*Assistant Examiner* — Iftekhar Khan
(74) *Attorney, Agent, or Firm* — Gates & Cooper LLP (57) ABSTRACT

A method, apparatus, and article of manufacture provide the ability to shape a terrain. An associative framework dependency graph used to control the shaping of the terrain is established. The graph defines an association between and processing order for two or more nodes that include an input node and an action node. The input node is a drawing entity or set of one or more geometric parameters. The action node is dependent on and uses the input node as input to perform an evaluation and produce an output object. The associative framework dependency graph is displayed and evaluated by evaluating the action node in accordance with the processing order to produce a finished ground terrain.

28 Claims, 7 Drawing Sheets

(56) References Cited

U.S. PATENT DOCUMENTS

| | | | |
|---|---|---|---|
| 8,676,546 | B2 | 3/2014 | Narayen et al. |
| 2001/0049704 | A1 | 12/2001 | Hamburg et al. |
| 2003/0023412 | A1* | 1/2003 | Rappaport et al. ............ 703/1 |
| 2004/0004611 | A1 | 1/2004 | Komornicki et al. |
| 2004/0076279 | A1 | 4/2004 | Taschereau |
| 2004/0194017 | A1 | 9/2004 | Cosic |
| 2004/0233222 | A1* | 11/2004 | Lee et al. .................. 345/621 |
| 2005/0034075 | A1 | 2/2005 | Riegelman et al. |
| 2005/0068315 | A1 | 3/2005 | Lewis et al. |
| 2005/0104884 | A1 | 5/2005 | Iwata et al. |
| 2005/0110800 | A1* | 5/2005 | Putnam et al. ............... 345/619 |
| 2006/0294062 | A1 | 12/2006 | Folchetti et al. |
| 2007/0142989 | A1 | 6/2007 | Koehrsen et al. |
| 2007/0168923 | A1 | 7/2007 | Connor et al. |
| 2008/0183434 | A1* | 7/2008 | Putnam et al. ............... 703/1 |
| 2008/0262988 | A1* | 10/2008 | Williams et al. ............. 706/13 |
| 2009/0055136 | A1* | 2/2009 | Ilies ............................. 703/1 |
| 2009/0179899 | A1* | 7/2009 | Gregory et al. ............. 345/473 |
| 2010/0017731 | A1 | 1/2010 | Taira |
| 2010/0289797 | A1* | 11/2010 | Tateno et al. ............... 345/419 |
| 2011/0246155 | A1* | 10/2011 | Fitch et al. .................. 703/6 |
| 2013/0007575 | A1 | 1/2013 | Bacus et al. |
| 2013/0013264 | A1 | 1/2013 | Narayan et al. |
| 2013/0013265 | A1 | 1/2013 | Narayan et al. |
| 2013/0054075 | A1 | 2/2013 | Montgomery |
| 2014/0121801 | A1 | 5/2014 | Taguchi et al. |

OTHER PUBLICATIONS

Michelena et al.("A Hypergraph FrameWork for Optimal Model-Based Decomposition of Design Problems", Computational Optimization and Applications, vol. 8, No. 2, Sep. 1997, pp. 173-196.).*
Autodesk, AutoCAD Civil 3D 2010 User Documentation, retrieved Mar. 12, 2013.
ESRI, Hydrologic Analysis, ArcGIS Desktop Help 9.1, latest update: Mar. 26, 2007, retrieved Mar. 13, 2013.
Schor et al., Landforming: An Environmental Approach to Hillside Development, Mine Reclamation and Watershed Restoration, Copyright 2007, John Wiley & Sons, inc. pp. 179, 184.
Brown et al., Gradients and Vector fields, Department of Mathematics, Statistics and Computer Science, University of Illinois at Chicago, http://www.math.uic.edu/coursepages/math210/labpages/lab5, retrieved Mar. 13, 2013, (1999).
Non-final Office Action dated Mar. 22, 2013 for U.S. Appl. No. 13/178,349.
Moore et al., Digital Terrain Modelling: A Review of Hydrological, Geomorphological, and Biological Applications, Hydrological Processes, vol. 5, 3-30 (1991).
D. Giordan, S. Moniz, "Using Adobe Photoshop 5" pp. 1-17, 2007.
Autodesk Design Review, Getting Started Guide, pp. 1-56, 2007.
Autodesk, AutoCAD Civil 3D 2010 Best Practices, Apr. 2009, Autodesk Inc., pp. 129, 132, 133, 137-156.

* cited by examiner

INTERACTIVELY SHAPING TERRAIN THROUGH COMPOSABLE OPERATIONS

CROSS-REFERENCE TO RELATED APPLICATIONS

This application is related to the following and commonly-assigned patent applications, which applications are incorporated by reference herein:

U.S. patent application Ser. No. 13/178,349, now U.S. Pat. No. 8,676,546, filed on Jul. 7, 2011, issued on Mar. 18, 2014, entitled "GRADING METHOD UTILIZING FLOW GRADE SOLUTION", by Smita Narayan and Christopher E. Putnam, et. al.; and U.S. patent application Ser. No. 13/178,358, filed on Jul. 7, 2011, entitled "DIRECT MANIPULATION OF COMPOSITE TERRAIN OBJECTS WITH INTUITIVE USER INTERACTION", by Smita Narayan and Christopher E. Putnam, et. al.

BACKGROUND OF THE INVENTION

1. Field of the Invention

The present invention relates generally to computer aided design (CAD) applications, and in particular, to a method, apparatus, and article of manufacture for interactively shaping a terrain through composable operations in a building information model (BIM) of a CAD.

2. Description of the Related Art

Grading is configuring the land's surface by removing or adding soil and other earthen material to artificially shape the land to best suit a project. The grading of a site serves three basic purposes: functional, drainage, and aesthetic. These basic purposes often conflict with each other and prior art solutions fail to provide an easy mechanism to satisfy all of these purposes while utilizing a single grading model as the user proceeds from concept to completion of a project. Such problems may be better understood with a description of prior art grading and grading solutions.

Functionality: Terrain grading is used to re-form terrain/land in order to provide land that is functional or can be used for a functional purpose. In this regard, grading reforms the terrain to make it compatible for an intended land use. Such functional land uses may include parking lots, ponds, swales, and other features. To provide for such land use, terrain grading creates finish smooth slopes at specified grades.

Facilitate Drainage: Grading establishes and controls the new drainage pattern to direct the runoff to outfall points and away from buildings.

Aesthetic: A good design creates an aesthetically pleasing and appealing landscape. Natural landforms are created by using concave and convex shaped slopes rather than uniform gradient slopes. The creation of aesthetic landforms must be balanced by the cost of constructing them.

These goals often conflict with each other and to integrate them into the final design, they must be analyzed collectively. In practice, a grading plan is established through several successive trials of different schemes. This process can be very tedious. A grading scheme often involves projecting slopes from curves representing shoulder edges or water boundaries, and leveling them against the existing terrain. The implementation of this concept is fraught with difficulties due to a variety of complex scenarios that cannot be handled by a naïve ray projection algorithm, especially when projecting from curves with rapid elevation changes.

More specifically, prior art products provide a grading scheme by projecting each segment of a curve at a given cross-slope to produce bounded panels, and then combining them. Such a methodology involves complex models whose history of operations is difficult to track. In addition, the complexity of the prior art solutions provides for difficult implementation and is prone to errors. Consequently, prior art solutions may fail completely when supplied geometry is complicated. Such a lack of stability has prevented users from readily adopting the prior art solutions. The prior art also provides few tools to modify existing solutions in an intuitive manner. Further, the prior art fails to provide tools that can be used in a conceptual design that can also later be refined for generating production drawings. In this regard, it is desirable to provide a tool that can be used to obtain quick answers for early decision making (e.g., approximate values of earthwork quantities) that can be refined later to produce a more accurate solution.

As described above, a particular need is that of designing the terrain to facilitate drainage. The prior art provides a complex methodology that is neither natural nor user friendly. In this regard, the prior art measures the cross grade (or cross slope) perpendicular to the curve from which a slope is projected. Each segment of the curve is projected at a given cross-slope to produce bounded panels that are combined by intersecting them against each other. This approach involves complex algorithms to solve inside corners and the intersection of overlapping solutions. For example, the rapid transitions of offsets across the inside corners cause incomplete or failed 3D intersections of the adjacent, bounded planes. Likewise, a multi-elevation rounded corner projected beyond its radius produces equally complex intersection geometry. The intersections are solved by simplifying the geometry and integrating the solution into planar topology to remove redundant loops. However, stability problems and specialized functionality restrict the use of the prior art methods.

Thus, prior art solutions produce inside corners with complex geometry that is hard to clean, especially if the solutions involve degenerate partial solutions. Solving such inside corners involves complex algorithms and is a cumbersome process. In addition, when designing the drainage, the prior art fails to provide the ability to create or use organic shapes that could be used to produce an aesthetically pleasing landscape.

Moreover, there are few tools for modifying prior art solutions in ways that directly map to site development needs. Even though there is a large set of elevation/grade editing tools, the overlapping line work can create difficult to resolve stability problems and elevation conflicts. Predicting the impact of an edit to a solution requires experience, and factors like tessellation quality, crossing break lines, and Delaunay triangulation rules can confound a new user.

Further, prior art solutions do not scale easily and fail to enable a user with the ability to change the order of overlapping solutions without recreating the geometry. In addition, prior art solutions require several steps and prompts to create enhanced features (e.g., parking lots, ponds, etc.) in a manner that is tedious and non-intuitive. Also, prior art methods fail to provide a good mechanism for directing the drainage path and only enable the creation of a final terrain after combining a final solution with an existing terrain. The prior art does not provide a mechanism to control the refinement of a final solution (e.g., showing or hiding hard edges). Lastly, the prior art does not provide the ability to track the history of operations from a finished model.

As described above, the existing solution does not allow the creation of a conceptual model that can later be refined into a more accurate model. In practice, before any detailed grading plans are underway, the designer needs to develop a generalized grading scheme to determine any problem areas and get a feel for the type of limitations the site may have as the design progresses. In the preliminary analysis, engineers are often looking for quick early-stage approximate answers (like road and parking area gradients, drainage patterns, rough estimates of cut and fill quantities, need for steep slopes, retaining walls, etc.) to make quick decisions that can later be refined into more accurate solutions for production drawings. The prior art fails to provide such capabilities.

In view of the above, it is desirable to enable a single set of tools that can be used from concept through completion, in the same model environment, while allowing the user to design a grading solution in a natural and desirable manner.

SUMMARY OF THE INVENTION

Embodiments of the present invention overcome the problems of the prior art by providing a model for expedited development of a finished ground by providing a composable model where each operation/action is arranged as a node of an associative framework dependency graph.

Such a model is highly composable. Composability is a system design principle dealing with the inter-relationships of components. A highly composable system provides components that can be easily combined and assembled in various ways. Embodiments of the invention provide a model that allows engineers to combine simple pieces, into more complex components, representing pre-implemented pieces of design, that can be easily integrated into the terrain.

Embodiments of the invention also provide a compositional model, implying that the whole model can be understood by understanding the parts and how they are combined. Such a model structure may be obvious to a user and easy to manage. This is achieved by ensuring that the operations are incremental and can easily be inspected, altered, or reverted.

A model in accordance with an embodiment of the invention allows clean intersections of overlapping solutions, and provides flexibility as it separates the actual implementation of the solution from how the operations are built. In other words, the model may allow the users to switch the evaluation engine without specifying the order of operations again. This is possible because the operations are processed in "action bodies" and solution units are stored in "input/output" objects, all arranged as nodes of associative framework dependency graph. Hence, the user can choose to solve the model using an "ACIS Evaluation Engine" or a "Tin Evaluator" instead of a "Depth Buffer Solver"—the input/output nodes may be updated with new solution units (TINs [triangulated irregular network] or ASM [Autodesk™ Shape Manager™] [e.g., a 3D solid modeling kernel] elements) and the whole model gets re-evaluated to produce new results. Some evaluators are sophisticated enough to provide hard edges and the results are much more accurate.

Embodiments of the invention provide a model using a holistic approach to terrain shaping, by allowing the users to go from concept to completion, which can help design teams develop designs that better meet project goals such as sustainability, cost, aesthetics, etc.

Embodiments of the invention also provide a rich, expressive set of general-purpose components and operations whose main characteristics are flexibility, versatility and ease of use. Such components and operations can be customized to tailor the workflow to suit the needs of a given project. In the civil engineering discipline, every site is unique and there are many aspects to the engineering projects that cannot be solved by standard parts. Embodiments of the invention provide a structured language to civil engineers by presenting a single set of rules to compose and combine the primitive components to give predictable results. For example, a complex shape such as that of a parking lot or a pond can be expressed as a combination of these primitive shapes. By identifying and organizing all of the different operations and primitive objects needed to create a design into a complete set, the users can create sustainable, structured and versatile designs and interact seamlessly with the application.

Embodiments of the invention allow the addition of enhanced, complex land features with simple commands while allowing the user to re-order operations to produce different results in case of overlapping solutions and providing in-progress feedback through volume tools, as the design evolves.

BRIEF DESCRIPTION OF THE DRAWINGS

Referring now to the drawings in which like reference numbers represent corresponding parts throughout:

FIGS. 3A-3B and FIG. 4 illustrate exemplary associative framework dependency graphs in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a framework for combining operations and updating the operations in a proper sequence to build the finished ground, by arranging each operation as a node of an associative framework dependency graph.

Each action/operation takes a given set of constraints (slopes/grade breaks, etc.), and solves them, leading to an output that is used as read dependencies by subsequent actions. The finished ground is presented automatically through an entity that updates dynamically following user edits. The object relationships in the graph are defined in a uniform, structured, and controlled manner. Further, when input parameters change, network evaluation updates the actions in the correct order. Accordingly, embodiments of the invention allow an opportunity to build a rich, expressive set of general-purpose components and operations whose main characteristics are flexbility, versatality and ease of use.

The simple components can be combined and assembled into more complex components, representing pre-implemented pieces of design, ready to be integrated into the terrain. The model allows the presentation of simple commands for applying a collective sequence of operations to shape the terrain in ways that directly map to the site development needs. By separating the actual implementation of terrain shaping solutions from how the operations are built, the model enables the users to switch the evaluation engine without specifying the sequence of operations again. Associative capabilities help speed changes during design and allow opportunities to present and re-order the operations to achieve different results. Finally, the model allows opportunities for direct manipulation capabilities to empower the users to optimize their designs with intuitive user interaction and dynamic feedback.

Hardware Environment

Figure 1:
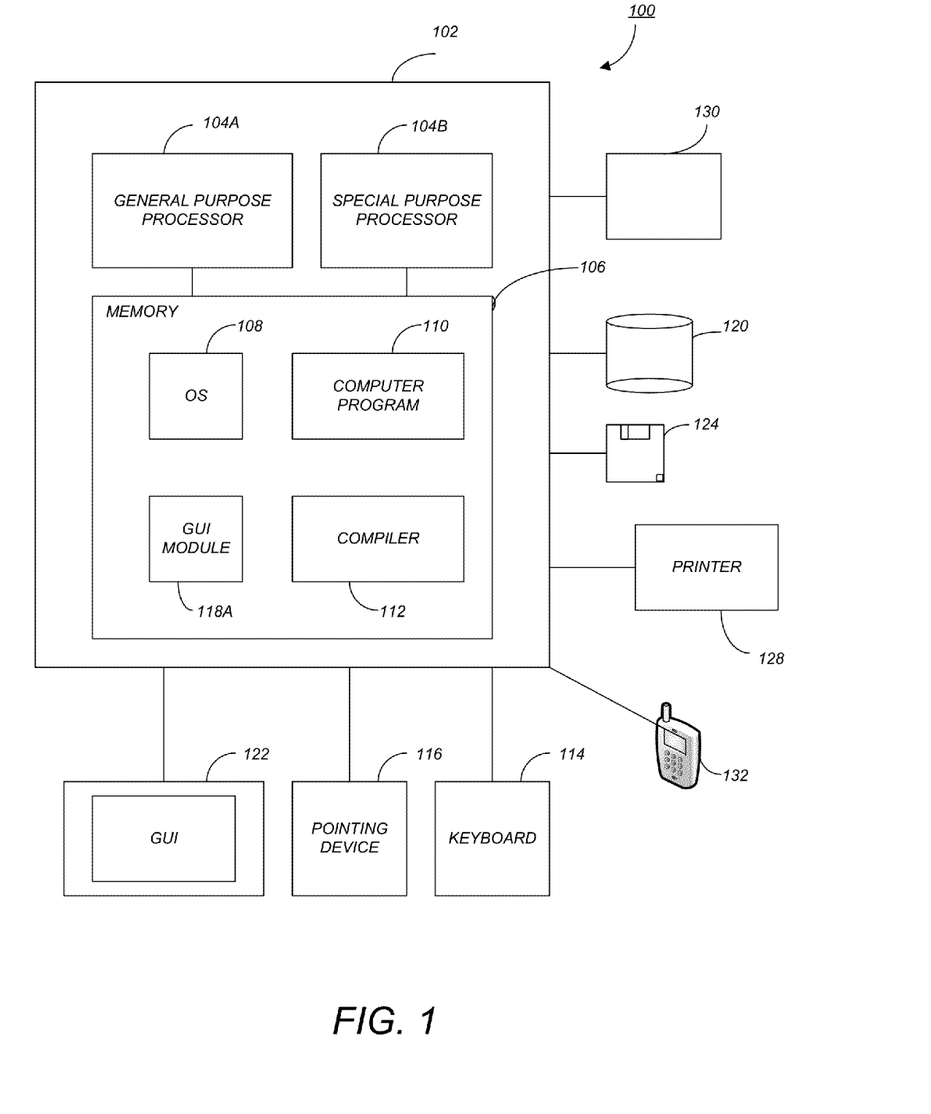
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. In one or more embodiments, computer 102 may be coupled to or may comprise a thin client device. Such a thin client device may comprise a device with limited and/or full processing capabilities and is often portable/handheld and may include a media viewing/listening device 132 (e.g., an MP3 player, iPod™, Nook™, portable digital video player, cellular device, personal digital assistant, handheld computer, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
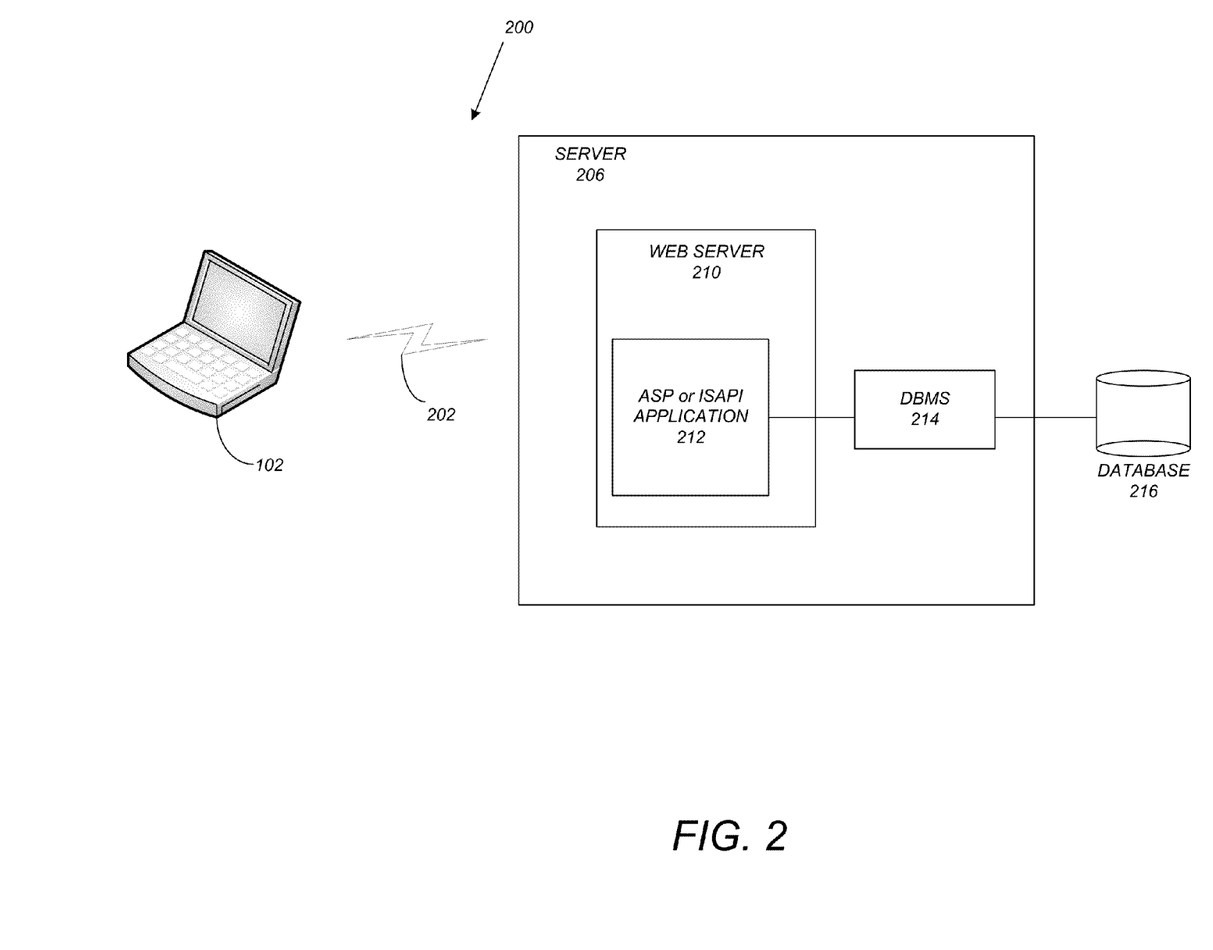
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include portable devices such as cell phones, notebook computers, pocket computers, or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. As described above, such a software application provides a framework for combining operations and updating them in a proper sequence to build the finished ground, by arranging each operation as nodes of an associative framework dependency graph.

To define object relationships in a uniform, structured and controlled way, a model is built using an Associative Framework. The main building block of the framework is the concept of an action. An action is an algorithm that when executed, takes some input, performs the calculations and produces some output. Further, custom actions can be defined that evaluate an operation using some input parameters and then produce an output object as a plane, depth buffer, or any other geometry resulting from the evaluation.

For example, an action can take a slope parameter and a curve as an input object and produce a depth buffer (see co-pending application entitled "Grading Method Utilizing Flow Grade Solution" cited above and incorporated by reference herein) as the output object. Another action can take an existing ground and produce a geometry that mirrors the existing ground. Another action can take plane parameters and a plane boundary and produce a bounded plane. Yet another action can take two elements and combine them using Boolean operations to produce a composite object. The Boolean operations can be used to add fill, remove cut, or introduce grade breaks.

The action parameters that need to be shared across multiple actions are defined in associative variables, whose values can be edited by the user (e.g., through dimension grips). When the input parameters change, the action is notified and later evaluated; its evaluation updates the output objects. Only the objects that need to be updated are actually updated, and are updated in the correct order.

A composable grading model may serve one or more of the following purposes:

1. Drainage: The user can build a surface layout by combining planes with specific flow grades and directions, thus allowing the user more control on directing drainage to outfall points. This workflow is especially relevant while designing a stepped parking lot from the entrance point.

2. Precision of Results: The model allows the user to switch the evaluation engine without specifying the operations again. Thus, the user can fine tune the design by switching a model from, e.g., an approximate grid-based model to an ASM model, that provides a more accurate finished ground with hard edges.

3. Pre-implemented design pieces: The commonly used operations can be combined into canned commands, making the workflow much simpler. The user is able to specify a handful of standard entities (e.g., a pond, a parking lot, etc.) to be added to the terrain, making this work far easier than in the prior art.

Exemplary Dependency Graph

To initially utilize a dependency graph in a CAD system, a graph is created and populated with nodes that produce the finished ground matching the existing ground within the site boundary. As operations are added, the finished ground is modified automatically. Similarly, as operations are performed in a CAD model, the dependency graph may be automatically modified. Accordingly, any actions used to modify/build the grading entity are recorded in the dependency graph.

Figure 3A:
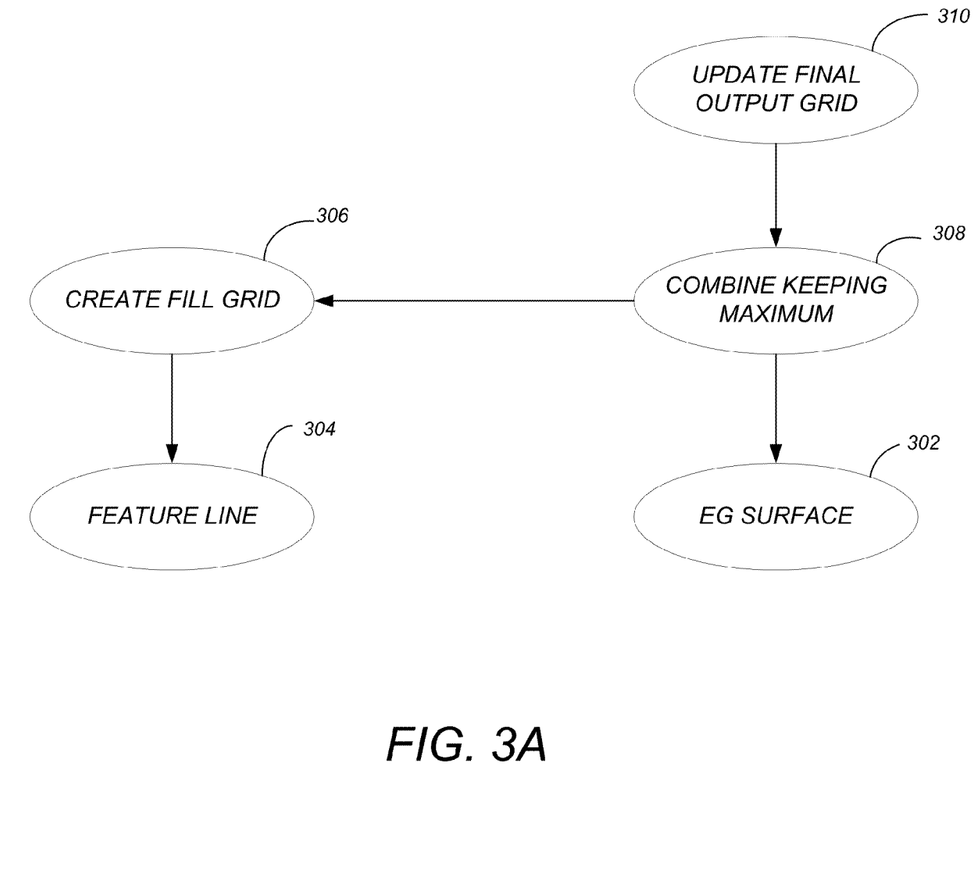
Figure 3B:
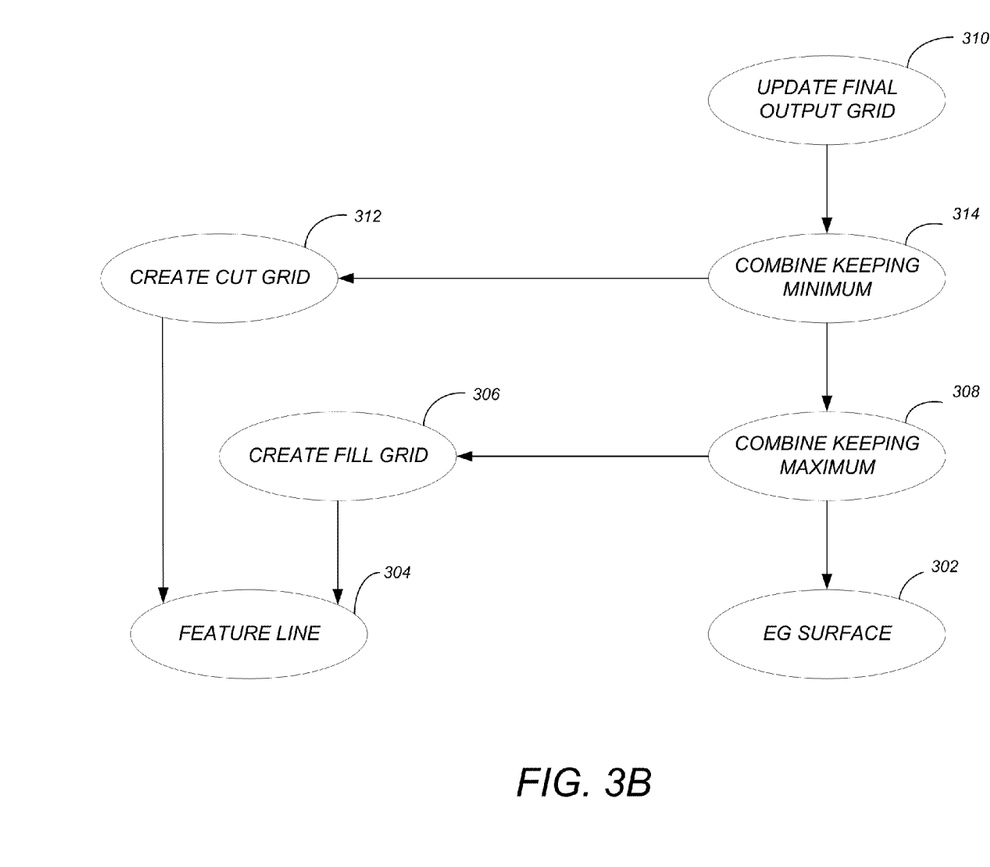
Figure 4:
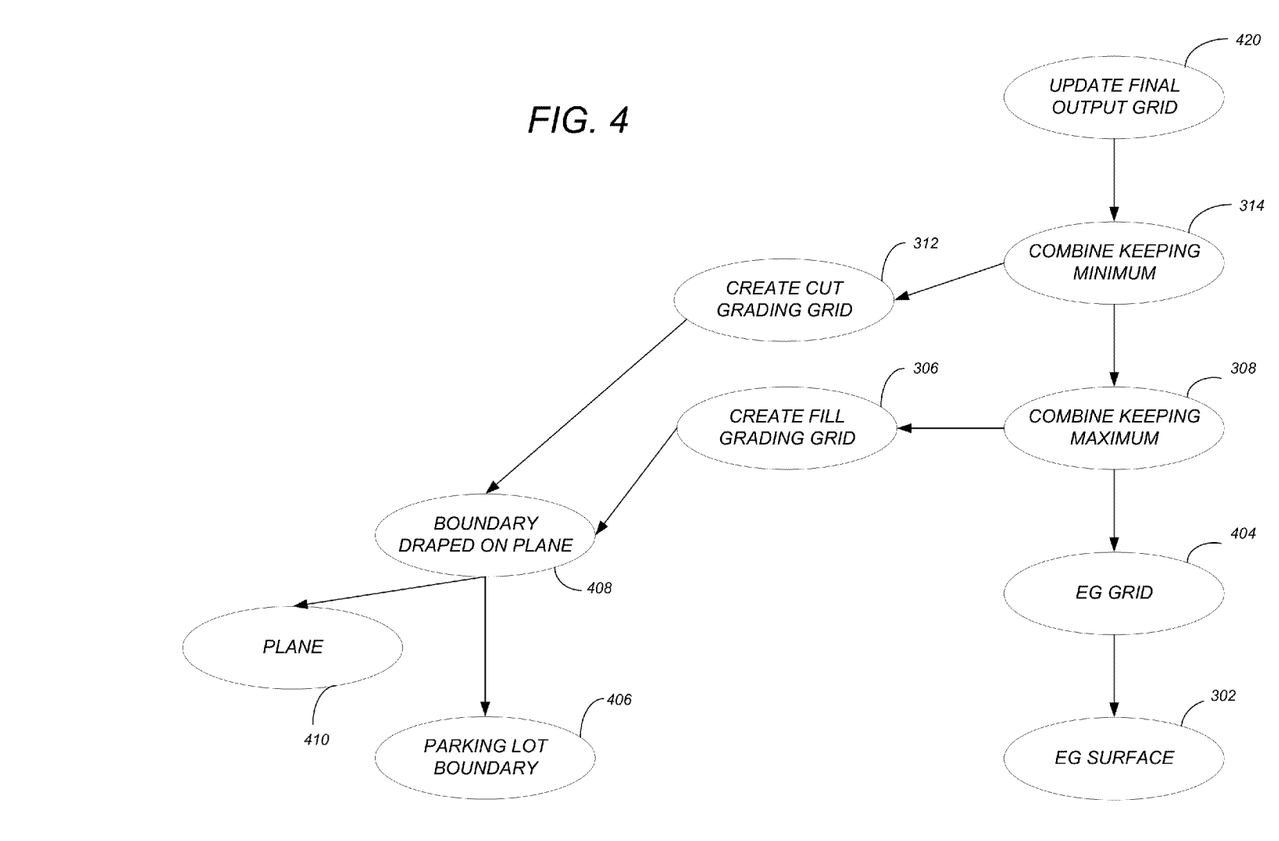
FIG. 4 is an associative framework dependency graph representing a parking lot that uses the operations of FIGS. 3A and 3B and was added to the surface using a create parking lot command in accordance with one or more embodiments of the invention.

FIGS. 3A-3B and FIG. 4 illustrate exemplary associative framework dependency graphs in accordance with one or more embodiments of the invention.

In FIG. 3A, the model/surface begins with an existing surface via element/node 302. The user desires to add a fill to the existing surface. The user creates/utilizes a feature line element 304 and based thereon uses a create fill grid operation 306. Thus, a grid 306 is created (i.e., output from action node 306) that represents a fill solution from a feature line 304. The existing surface 302 is combined with the fill grid 306 using operator node 308 that combines while keeping/maintaining the maximum elevation to create graded terrain. Such an operation 308 adds fill to the surface 302 by combining fill (e.g., depth buffer produced using a swept cone [as described in the copending application entitled "Grading Method Utilizing Flow Grade Solution" which is incorporated by reference herein] with the existing surface while keeping pieces with higher elevations in the output. The final output grid is then updated via operator node 310. Thus, in FIG. 3A, input nodes 302 and 304 are used by operator nodes 306, 308, and 310 to add fill to an existing surface and update the final output grid. The arrows in FIG. 3A represent that dependency order. Accordingly, the fill grid 306 depends on the feature line 304, and the final output grid 310 depends on the maximum operator node 308. Further, the output grid 310 is obtained/updated dynamically if any child nodes on which node 310 is dependent (e.g., nodes 302-308) are updated.

FIG. 3B illustrates the dependency graph where the further operation for removing a cut has been performed on the terrain added to the graph of FIG. 3A. Such an operation enables the user to remove dirt from the ground. Thus, based on the feature line input 304, a cut grid is created as represented by action/operator node 312. The prior result is combined with the created cut grid (while maintaining a minimum elevation at all grid points) using action/operator node 314 to produce the final output grid that is updated via node 310.

FIG. 4 is an associative framework dependency graph representing a parking lot that uses the operations of FIGS. 3A and 3B and was added to the surface using a create parking lot command in accordance with one or more embodiments of the invention.

The initial surface is represented by the existing surface node 302 and the existing grid 404. A create parking lot command is initiated which utilizes a parameter/input of a parking lot boundary represented by node 406. Action node 408 drapes the boundary 406 onto input plane 410 (e.g., created using various user-specified parameters). The dependency graph then combines the boundary 406 draped on the plane 410 with the existing surface 302 and grid 404. To combine the existing surface 302/grid 404 with the boundary 406 draped on the plane 410, a fill grading grid is created using action 306 and a cut grading grid is created using action 312—both of which are based on the boundary 406 draped on the plane 410 from action 408. The surface 302/grid 404 is combined (e.g., using a max operation) with the fill grade 306 ensuring that the maximum surface is not exceeded using action node 308. The cut grid 312 is combined (e.g., using a min operation) with the output of operation 308 (max operation) while ensuring a minimum surface is maintained via node 314. Lastly, the final output grid 420 is updated based on the combined surface 302/grid 404 and fill/cut grading grids.

Thus, FIG. 4 illustrates the ability to obtain an interior plane and cut and fill slopes on the outside of the boundary. The operations are all performed based on the user specifying a single build/create parking lot command while specifying (or using default) various parameters (e.g., the plane parameters—the absolute point through which the plane passes; where the parking lot surface lies, what the outside of the parking lot looks like, how does the parking lot blend into the existing ground 302 (e.g., cut and fill grade parameters).

Thus, a user can define a series of actions (also viewed as grouping a series of operations together), e.g., a create parking lot command, that performs/adds various actions to the dependency graph to result in a final output grid. The user can manipulate the dependency graph of FIGS. 3A-3B and FIG. 4 by moving nodes 302-420, adjusting the parameters to the nodes, and or modifying the engine that performs the actions for the action nodes. Further, as indicated in FIGS. 3A-3B and 4, each of the nodes is related to/associated with another node. Accordingly, the modification of one node/parameter for a node may affect any associated nodes (i.e., parent nodes). Based on such an association, whenever a node is edited, once the dependency graph and/or individual actions are evaluated, the evaluation updates any output objects. Such an updating is performed in the appropriate order based on the dependency graph. For example, as illustrated in FIG. 4, node 408 is associated with and dependent on child nodes 406 and 410. Further, nodes 306 and 312 are dependent on child node 408 (nodes 306 and 312 and both parent nodes for node 408). Thus, if input nodes 406 and/or 410 are modified (or their parameters are modified), node 408 is updated and the output objects used as input to nodes 306 and 312 are updated.

The updating of the nodes will be performed in the correct order such that the output from nodes 306 and 312 to nodes 308 and nodes 314 will not be performed before updating the output from node 408 which is used as input to nodes 306 and 312. Such an association and performance was not possible in the prior art. For example, in the prior art, the outside boundary of the parking lot 406 was not tied to the plane geometry 410. Thus, if the user attempted to change the drainage point of the parking lot, many individual elevation edits were required that were not neatly tied to the user's intent—e.g., to force the water to flow to a certain location/point of the parking lot. Here, the user's intent is directly modeled based on user actions.

Figure 5:
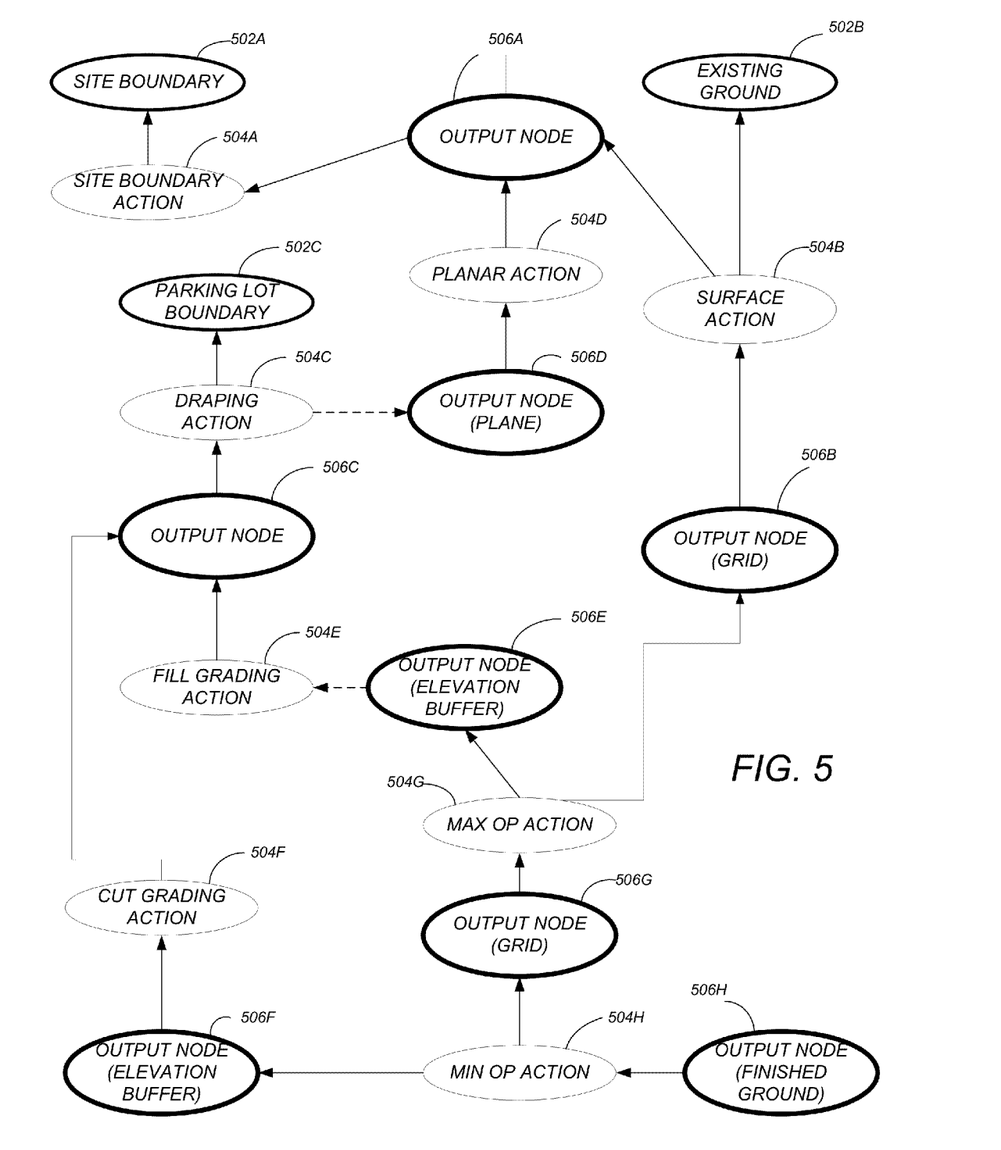
FIG. 5 illustrates a further associative framework dependency graph in accordance with one or more embodiments of the invention.

FIG. 5 illustrates a further associative framework dependency graph in accordance with one or more embodiments of the invention. Input nodes 502 (i.e., site boundary input node 502A, existing ground input node 502B, and parking lot boundary node 502C) are processed by action nodes 504 (i.e., action nodes 504A-504C). The action nodes 504 perform operations on the input nodes 502 to produce output nodes 506 that may be used by other action nodes 504. Further, the user may specify and edit one or more parameters to be used by the action nodes 504. For example, action body parameters (e.g., plane flow direction, cut grade, etc.) may be stored as associative variables (i.e., variables that participate in the associative network and drive a particular action 504, by establishing dependencies on it). Such parameters can be easily edited by the user in various manners (e.g., using dimension grips [grips/glyphs that can be dragged/moved by the user to modify the dimensions of an object/entity/plane/ etc.], text fields, radio button, slider, or any other graphical user interface mechanism).

In FIG. 5, the site boundary action 504A utilizes the site boundary 502A to produce output node 506A. The surface action 504B utilizes the existing ground input 502B as well as the output node 506A to produce the grid output node 506B. The planar action 504D also uses the output node 506A (as input) to produce a plane output node 506D that is further used as input to draping action 504C (along with the parking lot boundary input 502C). The draping action 504C drapes the parking lot boundary 502C onto the plane 506D to produce output node 506C. The resulting draped parking lot from output node 506C is used as input to the fill grading action 504E that enables the parking lot to be graded (e.g., using an elevation buffer) whereby an elevation buffer output node 506E is produced. The graded fill parking lot 506E is then combined with the grid output 506B (keeping the higher elevations of the respective grids representing the two terrains) to produce an updated grid output 506G. While the fill is computed using the draped parking lot 506C, a cut grading action 504F is also performed using the draped parking lot 506C to produce a different elevation buffer 506F. The elevation buffer 506F is used to determine a different slope geometry since the cut removes dirt from the terrain. The cut grade elevation buffer 506F is then combined with the grid output 506G (i.e., the grid representing the terrain graded in fill 506E) keeping the lower elevations of the respective grids representing the two terrains to produce the finished ground 506H as output.

While a specific evaluation engine may be used to perform the various actions 504, the user can switch the evaluation engine at any time while retaining the action nodes that specify the operation to be performed by the evaluation engine. Based on a change/switch in the evaluation engine (underlying the action nodes 504), the action output nodes 506 are replaced with new output nodes corresponding to the new evaluation engine. For example, a model based on a grid evaluation engine would produce grids as output nodes 506, which may serve as input nodes to other actions in the dependency graph. When this model is switched to a solid model, the action nodes 504 would produce ASM elements as output nodes 506. In other words, the depth buffers and grids that store the output of various actions in the form of output nodes 506 will be replaced with ASM elements. All actions 504 may then be re-evaluated. The action nodes 504 encompass the logic to produce the output using multiple evaluation engines. When evaluated, the action nodes 504 produce an output based on the active evaluation engine. The action parameters and the organization of the dependency graph does not change when the evaluation engine is switched.

Advantages

Embodiments of the present invention provide many advantages (over the prior art solutions) including simplicity, flexibility, and performance.

The associative framework provides a simpler interface to the user. In this regard, the complexity of the grading model is presented in a simpler form, clean intersection of overlapping solutions are provided, simple commands may be applied to a canned set of operations commonly used together for parking lot design, pond design, grade breaks to control drainage, etc., and the user is able to see the final results automatically by presenting a "finished ground."

The associative framework provides flexibility by separating the actual implementation of grading solutions from how the operations are built. Changing the order of operations allows the user to change the order of overlapping features, and thus control the appearance of the finished result. Such a presentation of operations also enables the user to track the history of creation. Thus, the user is able to build a final model using grids or ASM/ACIS elements as the underlying building model without specifying the sequence of operations again. Such capability serves to reduce the communications gap across engineers working on the same project, which is a large issue with prior art grading features.

The associative framework improves performance by updating in the correct order only those parts of the model that are impacted by a user's edits. In other words, only those parts of the model are evaluated that are impacted by the change.

Accordingly, embodiments of the invention can be distinguished from the prior art in various manners including one or more of the following:

1. The prior art solution requires complex algorithms to solve overlapping solutions. Each intersection is dealt with sequentially, and the solution does not scale easily. In embodiments of the present invention, the overlapping solutions clean up against each other automatically due to the way the individual pieces representing atomic solutions are combined with Boolean operations.

2. In the prior art solutions, it is not possible to change the order of overlapping solutions without recreating the geometry. However, in embodiments of the present invention, the order of operations can be changed simply by reordering the nodes of associative framework dependency graph.

3. The prior art solution requires several steps and prompts to create enhanced features such as parking lots, ponds, etc. The process is tedious and not intuitive. Embodiments of the present invention allow the creation of such enhanced features with simple commands.

4. The prior art methods do not provide a good way of directing the drainage path. Embodiments of the present invention provide simple commands to add grade breaks and direct drainage to outfall points.

5. In the prior art methods, the finished ground can be created only after combining the final solution with the existing terrain. In embodiments of the present invention, the finished ground is presented automatically after every operation.

6. In the prior art method, there is no way to control the refinement of the solution, and be able to show or hide hard edges. Embodiments of the present invention provide a way to switch the evaluation engine, to allow viewing the same model with a low level of refinement in the planning stage, and a highly accurate model with hard edges in the final stage.

7. In the prior art solution, there is no way to track the history of operations from the finished model. Embodiments of the present invention allow the user to track the order of operations through the graphical presentation of the dependency graph/operations.

Logical Flow

Figure 6:
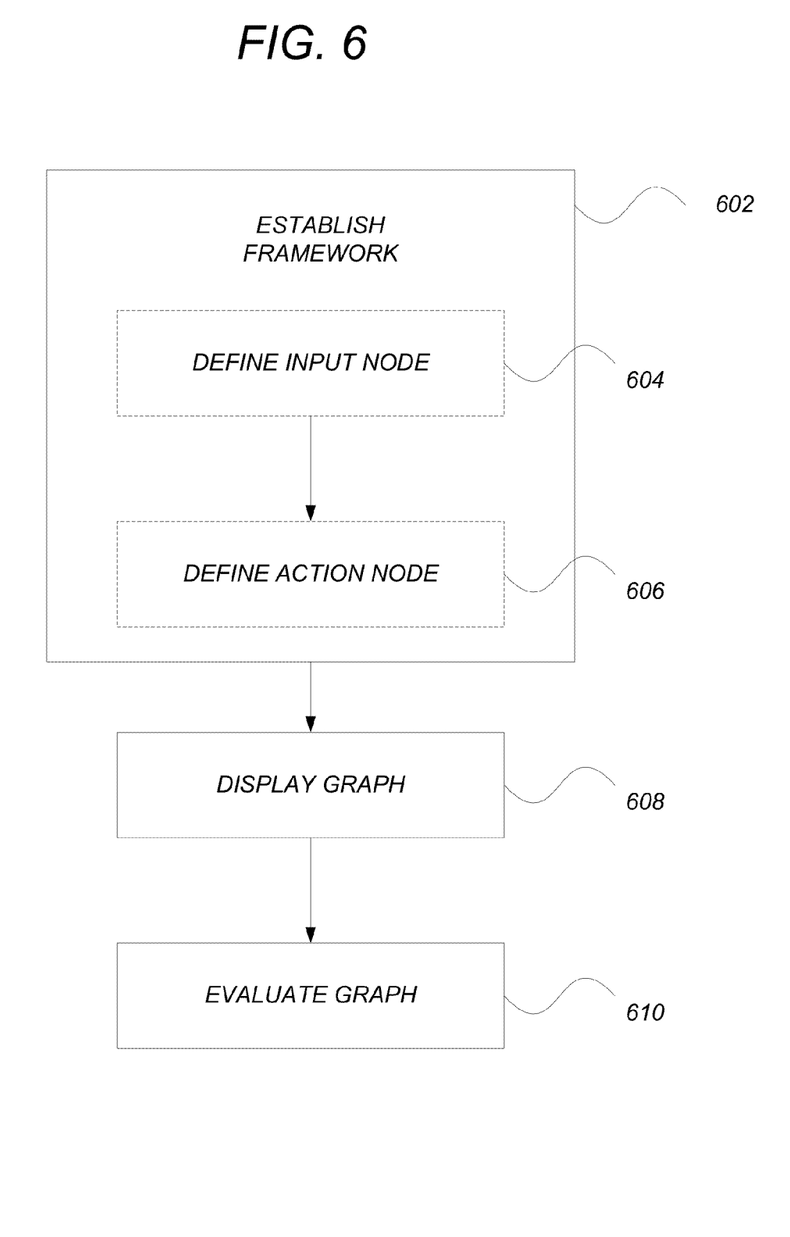
FIG. 6 is a flow chart illustrating the logical flow for shaping a terrain in accordance with one or more embodiments of the invention.

FIG. 6 is a flow chart illustrating the logical flow for shaping a terrain in accordance with one or more embodiments of the invention.

At step 602, an associative framework dependency graph used to control the shaping of a terrain is established (in a computer-aided design [CAD] building information modeling [BIM] application). The associative framework dependency graph defines an association between two or more nodes and a processing order for processing the nodes in the graph. As part of the establishing of the framework, steps 604 and 606 are performed.

At step 604, an input node (as/from one of the two or more nodes) is defined in the graph. The input node provides a drawing entity or a set of one or more geometric constraints/parameters. If the input parameter needs to be shared by more than one action node, it is defined using an associative variable that serves as an input node to multiple actions. In other words, the use of an associative variable allows the sharing of the parameter with a second action node. The values of the associative variable may be edited in order to modify the dependent action node(s) directly. Thus, the input parameters may be edited by the user through a graphical user interface element (e.g., a dimension group).

At step 606, an action node (as/from one of the two or more nodes) is defined in the graph. The action node is dependent on one or more input nodes. As part of such a dependency, the input node is used as input to the action node. The action node is configured to perform an evaluation (e.g., using the input node) and produce an output object. Such an output object may then be used as an input to a subsequent action node.

The input node and actions performed on such an input node may take various forms. For example, the input node may be an existing surface node (representing the existing surface of the terrain) and the output object from the action node may be a geometry that mirrors the existing surface. In another example, a first input node may be a slope parameter and a second input node may be a source curve with the output object being a depth buffer. The input nodes may also include a first node for a plane parameter and a second input node for a curve boundary with the output object being a bounded plane. An additional example provides that a first input node is for a source curve and a second input node for an offset parameter with the output object as an offset curve. In yet another example, a first input node may be a source curve and a second input node may be a grid with the output object as the source curve draped on the grid.

Further, the action node may also process two input nodes that specify/provide geometric elements. Such an action node may combine the two nodes using a Boolean operation with the output object being a composite object. In such an embodiment, the Boolean operation may provide an add fill/remove cut operation that adds fill grading to or removes earth from the terrain respectively. Alternatively, the Boolean operation may introduce a grade break (to create a hill or depression) in the terrain.

At step 608, the graph is displayed. Note that the display of the graph may occur when the graph is created or at a later time at the user's request (e.g., when the user elects to modify the graph).

At step 610, the graph is evaluated by evaluating the action node based on the processing order. Such an evaluation produces a finished ground terrain. Such a display 608 and evaluation 610 of a graph may further include the modification (in the graphical display) of geometric constraints, the input node, the action node, parameters for the nodes, the processing order of the nodes, etc. If a particular node is modified, any nodes dependent on the particular node are notified of the modification. For example, if a geometric constraint is modified, the action node dependent on the input node (having the geometric constraint) is notified of the modification. In response to the notification, the action node may be dynamically evaluated (in accordance with the processing order) to produce an updated output object. Such a dynamic evaluation may be performed in real-time without additional user input/interaction. In other words, when an input is modified, the display of the terrain is automatically and dynamically updated to reflect the modification. Further, such an updating is performed with respect to any output objects that may be affected by the change (as determined by the dependency graph).

The display 608 and evaluation 610 may also include the replacement of an evaluation engine that performs the evaluation 610. Such a replacement does not require the user to re-specify or re-define any of the operations as such operations are specified in the dependency graph and only the evaluation engine is modified. Such a replacement of the evaluation engine was not possible in the prior art.

Lastly, the display 608 and evaluation 610 may also include the ability to combine multiple geometric operations into a single command that can be invoked by the user. When invoked, new nodes are automatically (i.e., without additional user interaction) defined in the dependency graph wherein the new nodes represent the geometric operations. Such a capability enables the user to define a canned set of operations that may be invoked using a single command while reflecting the details of the operations in the dependency graph which the user can then edit on an individualized basis if desired.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for shaping a terrain comprising:
   (a) establishing, in a computer-aided design (CAD) building information modeling (BIM) application, an associative framework dependency graph used to control the shaping of the terrain, wherein the associative framework dependency graph defines an association between two or more nodes and a processing order for processing the two or more nodes, wherein the establishing comprises:
      (i) defining, from one of the two or more nodes, one or more input nodes in the associative framework dependency graph, wherein one or more input nodes represent a drawing entity or a set of one or more geometric parameters;
      (ii) defining, from one of the two or more nodes, an action node in the associative framework dependency graph, wherein:
         (1) the action node is dependent on the one or more input nodes;
         (2) the one or more input nodes are used as input to the action node;
         (3) the action node performs an evaluation and produces an output object;
   (b) displaying a graphic representation of the associative framework dependency graph comprising the one or more input nodes, the action node, and one or more lines representing relationships between the one or more input nodes and the action node;
   (c) evaluating the associative framework dependency graph by evaluating the action node in accordance with the processing order, wherein the evaluating produces a finished ground terrain;
   (d) modifying one or more of the one or more geometric parameters;
   (e) notifying the action node, that is dependent on the one or more input nodes, of the modifying; and
   (f) in response to the notifying, dynamically evaluating the action node, in accordance with the processing order, to produce an updated output object.

2. The computer-implemented method of claim 1, wherein:
   a first input node of the one or more input nodes comprises an existing surface node, wherein the existing surface node represents an existing surface of the terrain; and
   the output object comprises a geometry that mirrors the existing surface.

3. The computer-implemented method of claim 1, wherein:
   a first input node of the one or more input nodes comprises a slope parameter and a second input node of the one or more input nodes comprises a source curve; and
   the output object comprises a depth buffer.

4. The computer-implemented method of claim 1, wherein:
   a first input node of the one or more input nodes comprises a plane parameter and a second input node of the one or more input nodes comprises a curve boundary; and
   the output object comprises a bounded plane.

5. The computer-implemented method of claim 1, wherein:
   a first input node of the one or more input nodes comprises a source curve and a second input node of the one or more input nodes comprises an offset parameter; and
   the output object comprises an offset curve.

6. The computer-implemented method of claim 1, wherein:
a first input node of the one or more input nodes comprises a source curve and a second input node of the one or more input nodes comprises a grid; and
the output object comprises the source curve draped on the grid.

7. The computer-implemented method of claim 1, wherein:
a first input node of the one or more input node comprises a first geometric element;
a second input node of the one or more input nodes comprises a second geometric element;
the action node combines the first input node and the second input node using a Boolean operation; and
the output object comprises a composite object.

8. The computer-implemented method of claim 7, wherein the Boolean operation comprises an add fill operation that adds fill grading to the terrain.

9. The computer-implemented method of claim 7, wherein the Boolean operation comprises a remove cut operation that removes earth from the terrain.

10. The computer-implemented method of claim 7, wherein the Boolean operation introduces a grade break in the terrain.

11. The computer-implemented method of claim 1, further comprising utilizing the output object as input to a subsequent action node.

12. The computer-implemented method of claim 1, further comprising:
defining a parameter of the action node in an associative variable to allow sharing of the parameter with a second action node; and
editing a value of the associative variable to modify the action node and second action node directly.

13. The computer-implemented method of claim 1, further comprising replacing an evaluation engine that performs the evaluating of the associative framework dependency graph.

14. The computer-implemented method of claim 1, further comprising:
combining two or more geometric operations into a single command;
invoking the single command; and
automatically defining, without additional user intervention, two or more additional nodes in the associate framework dependency graph, wherein the two or more additional nodes represent the two or more geometric operations.

15. An apparatus for shaping a terrain in a computer system comprising:
(a) a computer having a memory; and
(b) a computer-aided design (CAD) building information modeling (BIM) application executing on the computer, wherein the CAD BIM application is configured to:
(i) establish, in a computer-aided design (CAD) building information modeling (BIM) application, an associative framework dependency graph used to control the shaping of the terrain, wherein the associative framework dependency graph defines an association between two or more nodes and a processing order for processing the two or more nodes, wherein the CAD/BIM application is configured to establish the associative framework dependency graph by:
(1) defining, from one of the two or more nodes, one or more input nodes in the associative framework dependency graph, wherein the one or more input nodes represent a drawing entity or a set of one or more geometric parameters;
(2) defining, from one of the two or more nodes, an action node in the associative framework dependency graph, wherein:
(A) the action node is dependent on the one or more input nodes;
(B) the one or more input node are used as input to the action node;
(C) the action node performs an evaluation and produces an output object;
(ii) display a graphic representation of the associative framework dependency graph comprising the one or more input nodes, the action node, and one or more lines representing relationships between the one or more input nodes and the action node;
(iii) evaluate the associative framework dependency graph by evaluating the action node in accordance with the processing order, wherein the evaluating produces a finished ground terrain;
(iv) modify one or more of the one or more geometric parameters;
(v) notify the action node, that is dependent on the one or more input nodes, of the modifying; and
(vi) in response to the notifying, dynamically evaluate the action node, in accordance with the processing order, to produce an updated output object.

16. The apparatus of claim 15, wherein:
a first input node of the one or more input nodes comprises an existing surface node, wherein the existing surface node represents an existing surface of the terrain; and
the output object comprises a geometry that mirrors the existing surface.

17. The apparatus of claim 15, wherein:
a first input node of the one or more input nodes comprises a slope parameter and a second input node of the one or more input nodes comprises a source curve; and
the output object comprises a depth buffer.

18. The apparatus of claim 15, wherein:
a first input node of the one or more input nodes comprises a plane parameter and a second input node of the one or more input nodes comprises a curve boundary; and
the output object comprises a bounded plane.

19. The apparatus of claim 15, wherein:
a first input node of the one or more input nodes comprises a source curve and a second input node of the one or more input nodes comprises an offset parameter; and
the output object comprises an offset curve.

20. The apparatus of claim 15, wherein:
a first input node of the one or more input nodes comprises a source curve and a second input node of the one or more input nodes comprises a grid; and
the output object comprises the source curve draped on the grid.

21. The apparatus of claim 15, wherein:
a first input node of the one or more input nodes comprises a first geometric element;
a second input node of the one or more input nodes comprises a second geometric element;
the action node combines the input node and the second input node using a Boolean operation; and
the output object comprises a composite object.

22. The apparatus of claim 21, wherein the Boolean operation comprises an add fill operation that adds fill grading to the terrain.

23. The apparatus of claim 21, wherein the Boolean operation comprises a remove cut operation that removes earth from the terrain.

24. The apparatus of claim 21, wherein the Boolean operation introduces a grade break in the terrain.

25. The apparatus of claim 15, wherein the CAD BIM application is further configured to utilize the output object as input to a subsequent action node.

26. The apparatus of claim 15, wherein the CAD BIM application is further configured to:
- define a parameter of the action node in an associative variable to allow sharing of the parameter with a second action node; and
- edit a value of the associative variable to modify the action node and second action node directly.

27. The apparatus of claim 15, wherein the CAD BIM application is further configured to replace an evaluation engine that performs the evaluating of the associative framework dependency graph.

28. The apparatus of claim 15, wherein the CAD BIM application is further configured to:
- combine two or more geometric operations into a single command;
- invoke the single command; and
- automatically define, without additional user intervention, two or more additional nodes in the associate framework dependency graph, wherein the two or more additional nodes represent the two or more geometric operations.

* * * * *